US010901912B2

(12) United States Patent
Ramamurthy et al.

(10) Patent No.: US 10,901,912 B2
(45) Date of Patent: Jan. 26, 2021

(54) FLASH TRANSLATION LAYER TABLE FOR UNALIGNED HOST WRITES

(71) Applicant: Western Digital Technologies, Inc., San Jose, CA (US)

(72) Inventors: Ramkumar Ramamurthy, Bangalore (IN); Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/258,962

(22) Filed: Jan. 28, 2019

(65) Prior Publication Data

US 2020/0242045 A1 Jul. 30, 2020

(51) Int. Cl.
*G06F 12/00* (2006.01)
*G06F 12/1009* (2016.01)
*G06F 12/02* (2006.01)

(52) U.S. Cl.
CPC ...... *G06F 12/1009* (2013.01); *G06F 12/0246* (2013.01); *G06F 2212/7201* (2013.01)

(58) Field of Classification Search
CPC ............ G06F 12/1009; G06F 12/0246; G06F 2212/7201
See application file for complete search history.

(56) References Cited

U.S. PATENT DOCUMENTS

| 8,510,533 B2 | 8/2013 | Wang |
| 9,229,876 B2 | 1/2016 | Slepon |
| 9,870,153 B2 | 1/2018 | Sinclair |
| 9,971,514 B2 | 5/2018 | Sivasankaran et al. |
| 10,102,119 B2 | 10/2018 | Gopinath et al. |
| 10,157,012 B2 | 12/2018 | Kelner et al. |
| 2007/0101095 A1 | 5/2007 | Gorobets |
| 2011/0047347 A1* | 2/2011 | Li ........................... G06F 3/064 711/209 |
| 2014/0082323 A1* | 3/2014 | Li ....................... G06F 12/0246 711/207 |
| 2015/0347026 A1 | 12/2015 | Thomas |
| 2016/0283110 A1* | 9/2016 | Jain ..................... G06F 13/1668 |
| 2018/0129599 A1 | 5/2018 | Kim |
| 2018/0293174 A1 | 10/2018 | Song et al. |
| 2019/0155723 A1* | 5/2019 | Park ..................... G06F 12/0246 |
| 2020/0159656 A1* | 5/2020 | Kim ..................... G06F 12/0246 |

* cited by examiner

*Primary Examiner* — Arvind Talukdar
(74) *Attorney, Agent, or Firm* — Vierra Magen Marcus LLP

(57) ABSTRACT

An apparatus is provided that includes a non-volatile memory and a memory controller coupled to the non-volatile memory. The memory controller is configured to access a global address table (GAT) that maps logical addresses of a host to physical addresses of the non-volatile memory, receive a request from the host to write first data to the non-volatile memory, determine that the first data comprises fragmented data that are not aligned to a minimum write unit of the non-volatile memory, and create an unaligned GAT page, wherein the unaligned GAT page comprises a logical-to-physical mapping for the first data.

20 Claims, 14 Drawing Sheets

Each sector = 512B, therefore each FMU = 4KB

Each FMU = 4KB, therefore each LG = 4MB

Each LG = 4MB, therefore GAT Directory addresses 4GB

| $LG_0C_0$ | $LG_0C_1$ | $LG_0C_2$ | $LG_0C_3$ | $LG_0C_4$ | $LG_0C_5$ | $LG_0C_6$ | $LG_0C_7$ |

Sequential Entry

FIG. 11A

| $LG_0C_0$ | $LG_0C_1$ | $LG_0C_2$ | $LG_0C_3$ | $LG_0C_4$ | $LG_0C_5$ | $LG_0C_6$ | $LG_0C_7$ |

Aligned GAT Page 0 — Sequential Entry

FIG. 11B

| $LG_0C_0$ | $LG_0C_1$ | $LG_0C_2$ | $LG_0C_3$ | $LG_0C_4$ | $LG_0C_5$ | $LG_0C_6$ | $LG_0C_7$ |

Aligned GAT Page 0 — Unaligned GAT Page 2 — Sequential Entry

FIG. 11C

FLASH TRANSLATION LAYER TABLE FOR UNALIGNED HOST WRITES

BACKGROUND

The present technology pertains to semiconductor non-volatile memory systems, and more specifically to management of data structures in such memory systems.

A common application of memory devices is as a data storage subsystem for electronic devices. Such subsystems are commonly implemented as either removable memory cards that can be inserted into multiple host systems, or as non-removable embedded storage within the host system. In both implementations, the subsystem includes one or more memory devices and a memory controller.

A memory controller performs a number of functions including the translation between logical addresses received by the memory subsystem from a host, and physical addresses within the memory cell array. The memory controller typically uses a mapping table or other data structure to map logical addresses to physical addresses. However, various challenges are presented in mapping logical-to-physical addresses in non-volatile memory systems.

BRIEF DESCRIPTION OF THE DRAWINGS

FIGS. 11A-11C depict embodiments of a GAT written with sequential data, fragmented data aligned to a flash management unit, and fragmented data unaligned to a flash management unit.

DETAILED DESCRIPTION

Figure 1A:
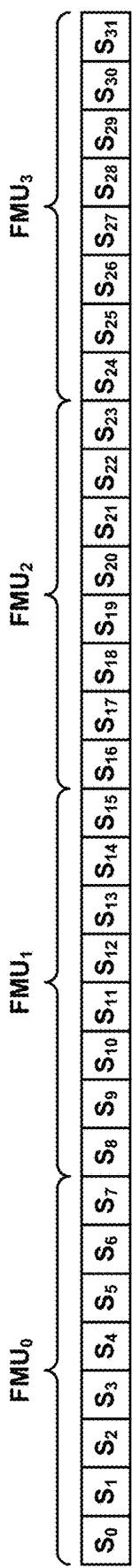
FIGS. 1A-1C are diagrams depicting data structures of a memory system.

Non-volatile memory devices, such as flash memory, are composed of one or more arrays of memory cells, each memory cell capable of storing one or more bits of data. Non-volatile memory does not require power to retain programmed data. Once programmed, a flash memory cell typically must be erased before being reprogrammed with a new data value. These memory cell arrays are partitioned into groups to provide for efficient implementation of read, program and erase functions. A typical flash memory architecture for mass storage arranges large groups of memory cells into erasable blocks, wherein a block contains the smallest number of memory cells (unit of erase) that are erasable at one time.

Each block includes multiple pages, with each page being a unit of reading/writing in the memory array. Each page is further divided into multiple segments, with each segment, referred to herein as a flash management unit (FMU), containing the amount of data that is written at one time during a basic programming operation.

A host and a non-volatile memory device typically use different addressing schemes for managing the storage of data. For example, the host may utilize a host addressing scheme, also referred to as a logical addressing scheme. When a host wants to write data to a non-volatile memory device, the host may assign a logical address (also referred to as a logical block address (LBA)) to the data. Similarly, when the host wants to read data from the non-volatile memory device, the host may identify the desired data by the logical address. The host may utilize a logical addressing scheme in which a host file system maintains a logical address range for all LBAs assigned or recognized by the host.

In addition, the host may address data in units of logical sectors. In many implementations, each sector includes 512 bytes of user data, but other amounts may be used. In embodiments, the host writes or reads data to/from a memory system by designating a starting logical sector address and specifying the total number of sectors.

In contrast to the host's logical addressing scheme, the non-volatile memory device typically stores and accesses data according to a physical addressing scheme that uses physical addresses different from the logical addresses assigned by the host to store and access data. To coordinate the host's logical addressing scheme with the non-volatile memory device's physical addressing scheme, the non-volatile memory device typically performs address translation in which the non-volatile memory device translates a logical address included in a host request to a physical address for storage or retrieval of data.

The memory controller organizes the host structures into logical constructs that mimic the physical structure for more efficient storage in the physical memory. For example, the memory controller typically groups logical sectors (as defined by the host) into logical blocks that correspond in size to the physical structure of a block. The memory controller can then maintain the relation of the physical structures to the logical constructs. For example, the memory controller maintains a flash translation layer (FTL) table that maps logical addresses used by the host to physical addresses used by the memory system. The FTL table is also referred to herein as a global address table (GAT).

In an embodiment, each flash management unit (FMU) includes eight sectors, although other numbers of sectors may be used. Thus, in an embodiment in which each sector includes 512 bytes of user data, each FMU includes 4 KB of user data. For example, FIG. 1A depicts a flash memory data structure that includes four FMUs, each of which includes eight sectors. That is, $FMU_0$ includes sectors $S_0$, $S_1$, $S_2$, ..., $S_7$, $FMU_1$ includes sectors $S_8$, $S_9$, $S_{10}$, $S_{11}$, $S_{12}$, $S_{13}$, $S_{14}$, $S_{15}$, $FMU_2$ includes sectors $S_{16}$, $S_{17}$, $S_{18}$, $S_{19}$, $S_{20}$, $S_{21}$, $S_{22}$, $S_{23}$, and $FMU_3$ includes sectors $S_{24}$, $S_{25}$, $S_{26}$, $S_{27}$, $S_{28}$, $S_{29}$, $S_{30}$, $S_{31}$. Flash memory data structures typically include more than four FMUs, but more or fewer than four FMUs may be used.

Figure 1B:
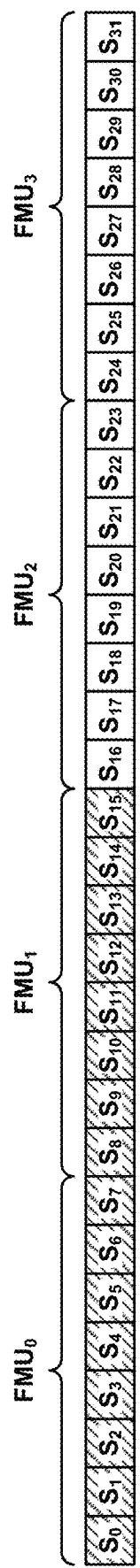

As previously described, a host typically writes data to a memory system by designating a starting logical sector address and specifying the total number of sectors. In some instances, the host may specify a starting logical sector address that aligns with the starting sector of an FMU, and may specify a total number of sectors equal to an integer multiple of the number of sectors per FMU. For example, referring to FIG. 1B, the host may designate a starting logical sector address that is mapped to sector $S_0$ of $FMU_0$, and may specify a total of sixteen sectors to write (i.e., sectors $S_0$, $51$, $S_2$, $S_3$, $S_4$, $S_5$, $S_6$, $S_7$ of $FMU_0$, and sectors $S_8$, $S_9$, $S_{10}$, $S_{11}$, $S_{12}$, $S_{13}$, $S_{14}$, $S_{15}$ of $FMU_1$).

In many instances, however, the host may specify a starting logical sector address that does not align with the starting sector of an FMU, and/or may specify a total number of sectors that are not equal to an integer multiple of the number of sectors per FMU (both referred to herein as an "unaligned write"). For example, referring again to FIG. 1C, the host may designate a starting logical sector address that is mapped to sector $S_3$ of $FMU_0$, and may specify a total of eight sectors to write (i.e., sectors $S_3$, $S_4$, $S_5$, $S_6$, $S_7$ of $FMU_0$, and sectors $S_8$, $S_9$, $S_{10}$ of $FMU_1$).

In such instances, previously known memory controllers typically pad sectors to the specified host data so that the memory system can program in FMU minimum write units. So in the unaligned write example described above, the memory controller would pre-pad the host data to be written with the existing data from sectors $S_0$, $S_1$, $S_2$ of $FMU_0$, and would post-pad the host data to be written with the existing data from sectors $S_{11}$, $S_{12}$, $S_{13}$, $S_{14}$, $S_{15}$ of $FMU_1$.

To perform this pre- and post-padding, the memory controller must typically load the GAT to cache to determine the logical-to-physical mapping of the pre-pad and post-pad sectors, read the existing data stored in the pre-pad and post-pad sectors and load that data to memory controller RAM, append the pre- and post-pad data to the host data, and then program the combined data to the flash memory. In addition to the overhead required to load the GAT to cache, read data from the pre- and post-pad sectors and then load the data to RAM, rewriting the pre- and post-pad sectors risks corrupting data stored in sectors that were previously acknowledged to the host as successfully written, and increases write amplification because of the pre-padding and post-padding operations.

Technology is described for handling unaligned writes so that the start of a host write does not need to be aligned to an FMU. As described in more detail below, the GAT is modified to also index data at an unaligned sector level, and includes an aligned GAT Page that contains an entry for each FMU, and an unaligned GAT Page that contains an entry for each sector.

Figure 2:
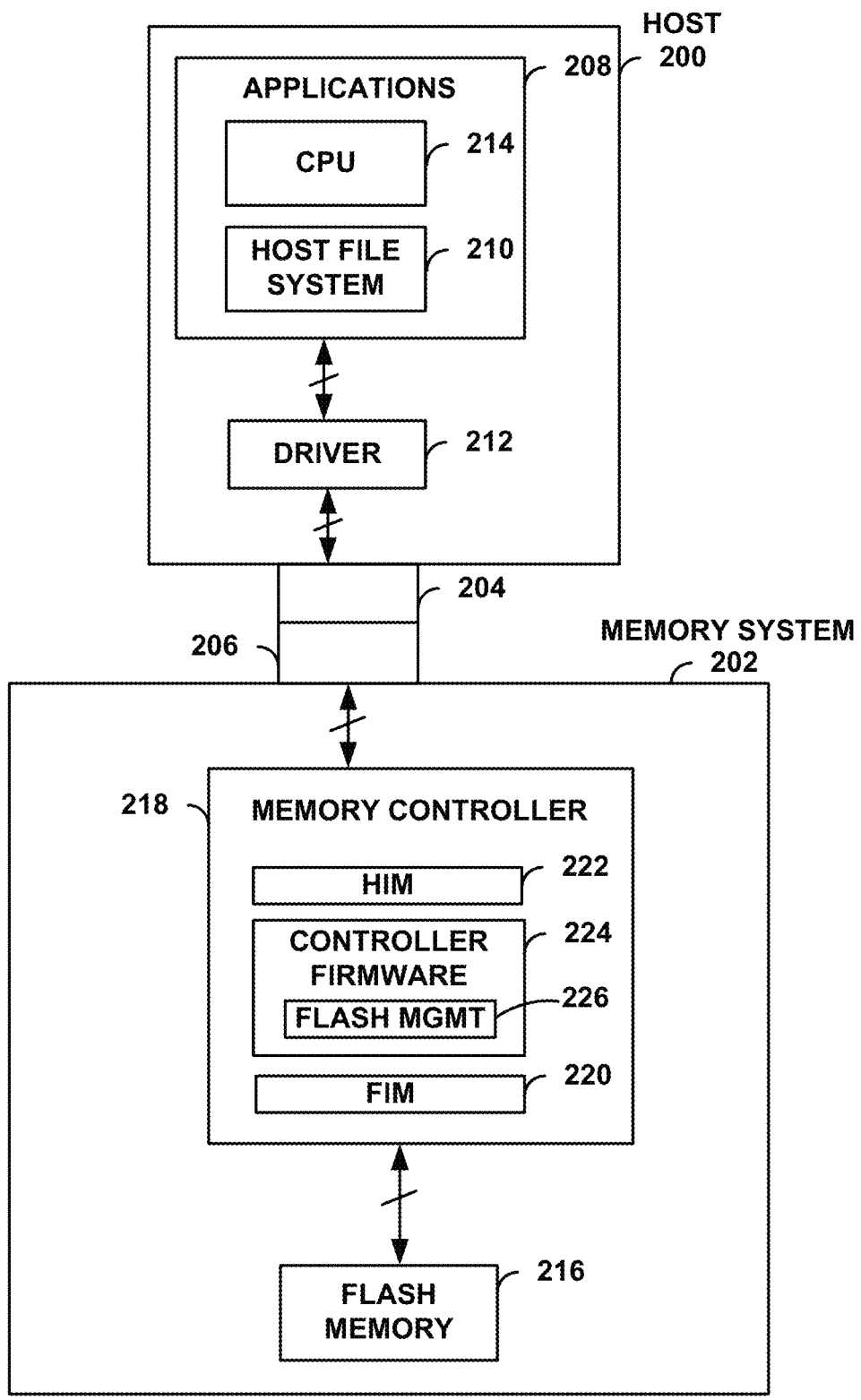
FIG. 2 is a block diagram of a host connected with a memory system having non-volatile memory.

An embodiment of a flash memory system is shown in FIG. 2. A host 200 stores data into and retrieves data from a memory system 202, such as a flash memory. Memory system 202 may be embedded within host 200, such as a solid state drive (SSD) installed in a personal computer. Alternatively, memory system 202 may be a flash memory card that is removably connected to host 200 through mating parts 204 and 206 of a mechanical and electrical connector. SSD drives may be discrete modules that are drop-in replacements for rotating magnetic disk drives. As described, flash memory may include NAND cells that each store an electronic charge.

Examples of commercially available removable flash memory cards include the CompactFlash (CF), the Multi-MediaCard (MMC), Secure Digital (SD), mini SD, Memory Stick, SmartMedia, TransFlash, and microSD cards. Although each of these cards may have a unique mechanical and/or electrical interface according to its standardized specifications, the flash memory system included in each may be similar. These cards are all available from SanDisk Corporation. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes memory controllers that interface with the host and control operation of the flash memory within them.

Host systems, such as host 200, that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is pugged.

Memory system 202 may include its own memory controller and drivers but some memory-only systems are instead controlled by software executed by the host to which the memory is connected. In some memory systems containing the memory controller, the memory, memory controller and drivers often are formed on a single integrated circuit chip. The host may communicate with the memory card using any communication protocol such as but not limited to Secure Digital (SD) protocol, Memory Stick (MS) protocol and Universal Serial Bus (USB) protocol.

Host 200 may be viewed as having two major parts, insofar as memory system 202 is concerned, including a combination of circuitry and software. Applications 208 may interface with memory system 202 through a file system module 210 and a driver 212. In a PC, for example, applications 208 may include a processor 214 for running word processing, graphics, control or other application software. In a camera or cellular telephone that is primarily dedicated to performing a single set of functions, applications 208 may be implemented in hardware for running software that operates the camera to take and store pictures, the cellular telephone to make and receive calls, and the like.

In an embodiment, memory system 202 includes non-volatile memory, such as flash memory 216, and a memory controller 218 that interfaces with host 200 for passing data back and forth and controls flash memory 216. In an embodiment, memory controller 218 is implemented on a single integrated circuit chip, such as an application specific integrated circuit (ASIC). In an embodiment, memory controller 218 includes a multi-threaded processor capable of communicating via a flash interface module (FIM) 220 having I/O ports for each memory bank in flash memory 216.

In an embodiment, memory controller 218 converts between logical data addresses used by host 200 and physical addresses of flash memory 216 during data programming and reading. In an embodiment, memory controller 218 also includes a host interface module (HIM) 222 that interfaces with host driver 212, and a controller firmware module 224 for coordinating with HIM 222. Flash management logic 226 may be part of controller firmware 224 for internal memory management operations such as garbage collection. One or more FIMs 220 provide a communication interface between memory controller 218 and flash memory 216.

In an embodiment, a FTL is integrated in flash management logic 226 and handles interfacing with host 200. In particular, flash management logic 226 is part of controller firmware 224 and FTL may be a module (not shown) in flash management logic 226. The FTL may be responsible for the internals of NAND management. In particular, the FTL may be an algorithm in the memory device firmware which translates writes from host 200 into writes to flash memory 216.

The FTL may be needed because flash memory 216: 1) may have limited endurance; 2) may only be written in multiples of pages; and/or 3) may not be written unless it is erased as a block. The FTL understands these potential limitations of flash memory 216 which may not be visible to host 200. Accordingly, the FTL translates the writes from host 200 into writes into flash memory 216.

The FTL may include a GAT that translates addresses for flash memory 216. An FTL algorithm may provide logical-to-physical address mapping which includes an algorithm to convert logical addresses from the file system of host 200 to physical addresses of flash memory 216. The FTL includes power-off recovery, sot that even if a sudden power-off occurs during FTL operations, the data structures of the FTL system can be recovered and consistency maintained. Wear-leveling by the FTL includes monitoring block usage so that the wear across blocks is even to prevent certain blocks from excessive wear, which would result in a greater chance of failure.

Each memory cell may be operated to store two levels of charge so that a single bit of data is stored in each cell. This is typically referred to as a binary or single level cell (SLC) memory. SLC memory may store two states: 0 or 1. Alternatively, each memory cell may be operated to store more than two detectable levels of charge in each charge storage element or region, thereby to store more than one bit of data in each. This latter configuration is referred to as multi-level cell (MLC) memory. For example, MLC memory may store four states and can retain two bits of data: 00 or 01 and 10 or 11.

Both types of memory cells may be used in a memory system, for example binary SLC flash memory may be used for caching data and MLC memory may be used for longer term storage. The charge storage elements of the memory cells are most commonly conductive floating gates but may alternatively be non-conductive dielectric charge trapping material, reversible resistance-switching memory elements, phase change memory elements, ferroelectric memory elements, or other types of memory elements, In an embodiment, flash memory 216 may include MLC or SLC memory, or a combination of MLC and SLC memory. Flash memory 216 may be included as part of memory controller 218 in some embodiments. Flash memory 216 may be mostly MLC, while binary cache and update blocks may be SLC memory. Update blocks may be SLC memory with page-based addressing or page-based logical group (LG) organization.

Figure 3:
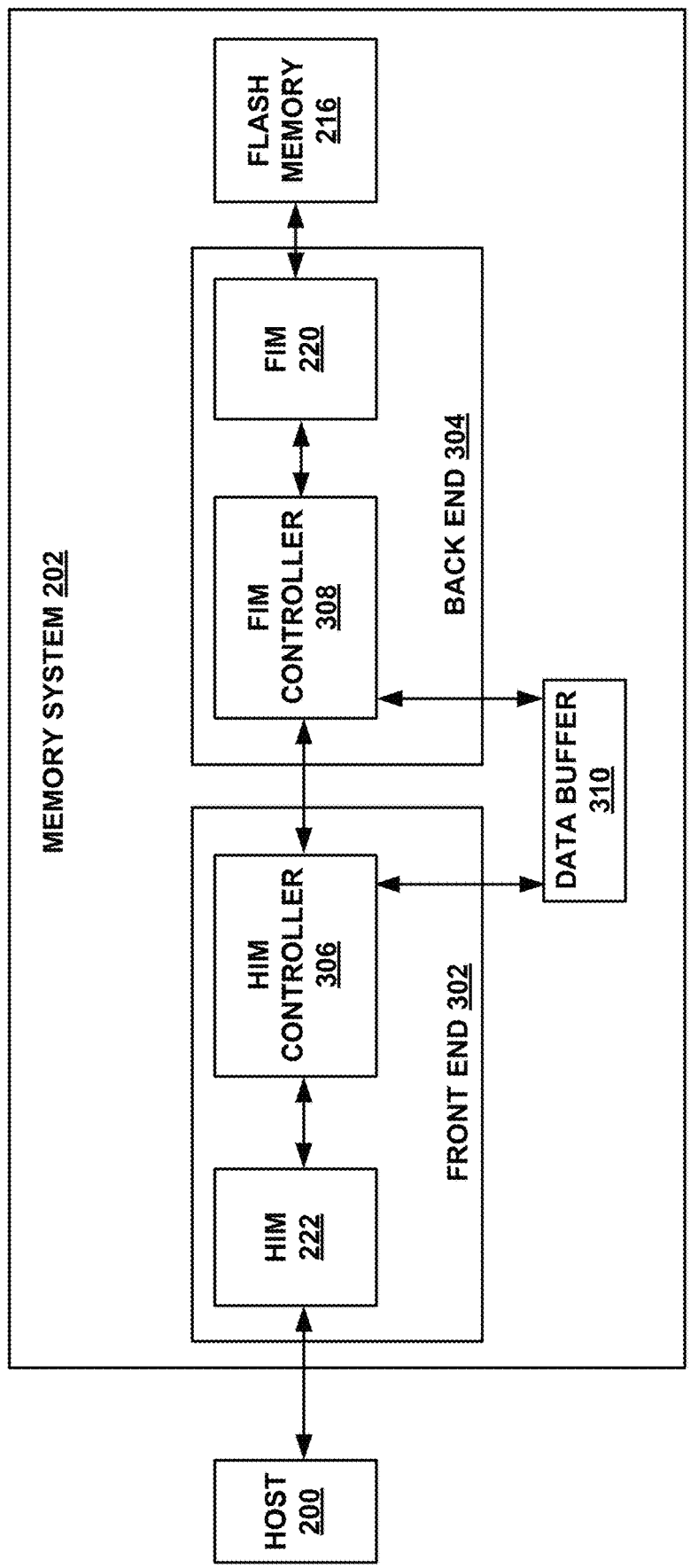
FIG. 3 is a block diagram of an alternative memory communication system.

FIG. 3 is a block diagram of an alternative memory communication system. Host 200 is in communication with memory system 202 as discussed with respect to FIG. 2. Memory system 202 includes a front end 302 in communication with host 200, and a back end 304 coupled with flash memory 216. In an embodiment, front end 302 and back end 304 may be part of memory controller 218. Front end 302 may logically include HIM 222 and a HIM controller 306. Back end 304 may logically include FIM 220 and a FIM controller 308. HIM 222 provides interface functionality for host 200, and FIM 220 provides interface functionality for flash memory 216. HIM controller 306 and FIM controller 308 may be coupled with a data buffer 310.

In operation, data are received from HIM 222 by HIM controller 306 during a write operation of host 200 on memory system 202. HIM controller 306 may pass control of data received to FIM controller 308, which may include the FTL discussed above. FIM controller 308 may determine how the received data are to be optimally written onto flash memory 216. The received data may be provided to FIM 220 by FIM controller 308 for writing data onto flash memory 216 based on the determination made by FIM controller 308. FIM controller 308 and the FTL may operate the logical to physical mapping of memory stored in flash memory 216.

Figure 4:
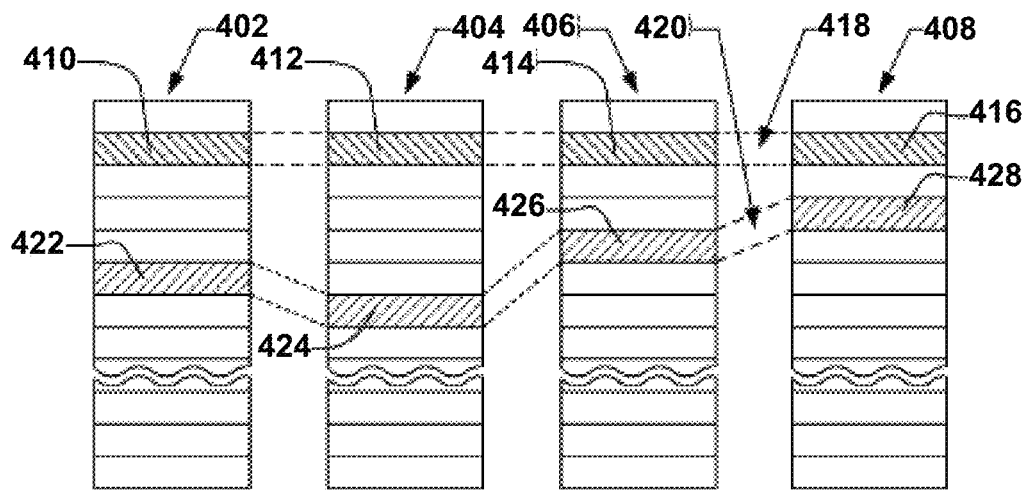
FIG. 4 is an example physical memory organization of the system of FIG. 2.

FIG. 4 conceptually illustrates an organization of flash memory 216 (FIG. 2) as a memory cell array. Flash memory 216 may include multiple memory cell arrays which are each separately controlled by a single or multiple memory controllers 218. Four planes or sub-arrays 402, 404, 406, and 408 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into groups of memory cells that form the minimum unit of erase, hereinafter referred to as blocks. Blocks of memory cells are shown in FIG. 4 by rectangles, such as blocks 410, 412, 414, and 416, located in respective planes 402, 404, 406, and 408. There can be any number of blocks in each plane.

A block of memory cells is the unit of erase, and the smallest number of memory cells that are physically erasable together. For increased parallelism, however, blocks may be operated in larger metablock units. In an embodiment, one block from each plane is logically linked together to form a metablock. The four blocks 410, 412, 414, and 416 are shown to form one metablock 418. All of the memory cells within a metablock are typically erased together.

The blocks used to form a metablock need not be restricted to the same relative locations within their respective planes, as is shown in a second metablock 420 made up of blocks 422, 424, 426, and 428. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 5:
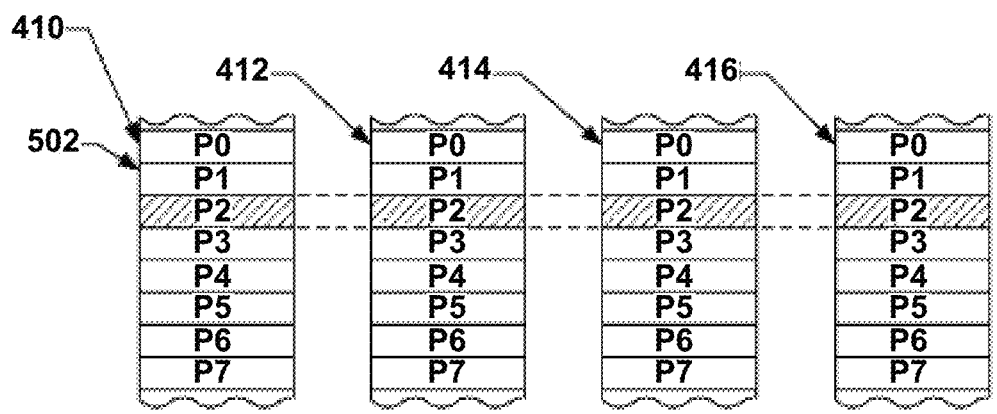
FIG. 5 is an expanded view of a portion of the physical memory of FIG. 4.

Each individual blocks is divided for operational purposes into pages of memory cells, as illustrated in FIG. 5. The memory cells of each of blocks 410, 412, 414, and 416, for example, are each divided into eight pages P0-P7. Alternatively, there may be 16, 32 or more pages of memory cells within each block. A page is the unit of data programming and reading within a block, containing the minimum amount of data that are programmed or read at one time.

To increase the memory system operational parallelism, however, such pages within two or more blocks may be logically linked into metapages. A metapage 502 is illustrated in FIG. 5, being formed of one physical page from each of the four blocks 410, 412, 414, and 416. The metapage 502, for example, includes the page P2 in each of the four blocks but the pages of a metapage need not necessarily have the same relative position within each of the blocks. A metapage may be the maximum unit of programming.

As described above, a flash memory may be organized into multiple blocks, with each block including multiple pages, and each page further divided into multiple FMUs, with each FMU containing the amount of data that is written at one time during a basic programming operation (also referred to herein as a minimum write unit (MWU)). In an embodiment of a GAT, logical-to-physical mapping is performed at two levels. In a first level, multiple FMUs are grouped into a logical group (LG), and the GAT includes a GAT Directory containing an entry for each LG. In a second level, a GAT Page includes an entry for each FMU.

Figure 6:
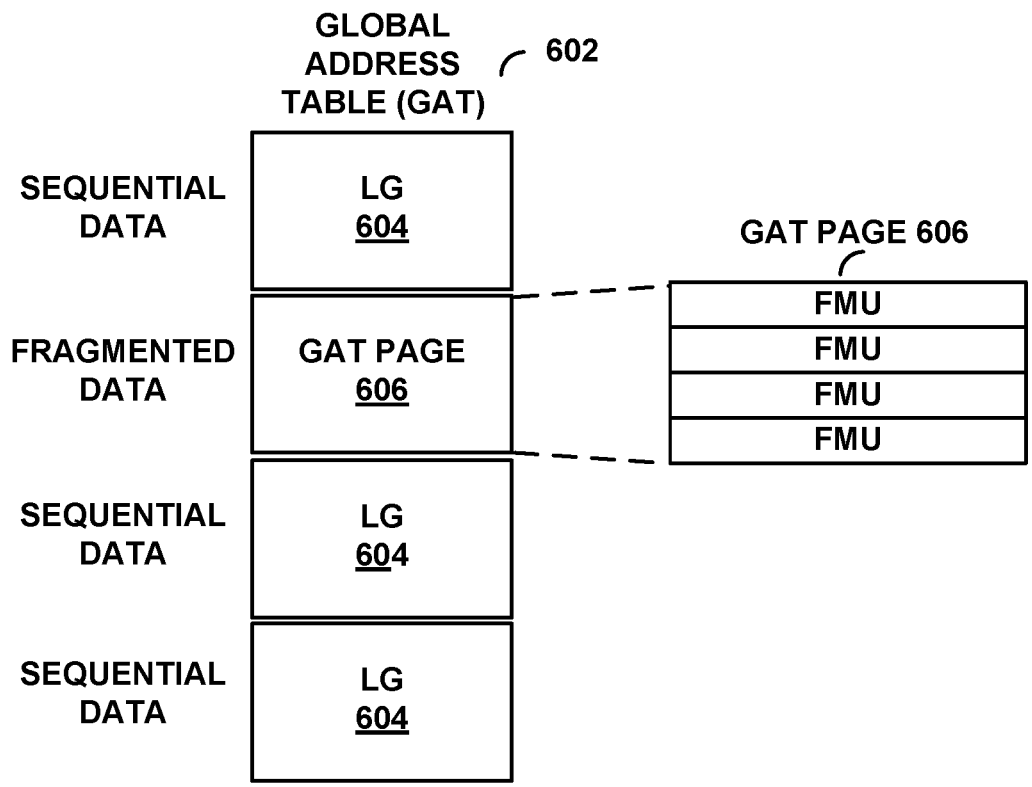
FIG. 6 is an embodiment of a global address table (GAT) with a GAT page.

FIG. 6 depicts an embodiment of a GAT 602, which includes a GAT Directory that includes an entry for each LG 604. In an embodiment, each LG 604 includes 1024 FMUs, and each LG 604 is 4 MB. In other embodiments, other sizes may be used for each LG. In an embodiment, LGs 604 are used for logical-to-physical mapping of sequential data. As used herein, "sequential data" are data that are grouped together. Sequential data can be indexed together (in one entry 604) to maintain the efficiencies gained by fewer entries in GAT 602.

GAT 602 also includes a GAT Page 606, which is used for logical-to-physical mapping of data that are not sequential, referred to herein as "fragmented" or "random." In an embodiment, GAT Page 606 is part of GAT 602. That is, GAT Page 606 is part of the same data structure as GAT 602. In other embodiments, GAT Page 606 is a different data structure that is pointed to from GAT 602.

GAT 602 includes a GAT Directory having three LGs 604 that reference sequential data, and one GAT Page 606 that references random data. GAT Directories may include more or fewer than three LGs and GATs may include more or fewer than one Gat Page. GAT Page 606 includes an entry for each FMU. As described above, in an embodiment, the size of each LG is 4 MB, and the size of each FMU is 4 KB. GAT Page 606 may reduce write amplification that would otherwise be associated with rewriting and copying from much larger LGs (e.g., during garbage collection).

Figure 7:
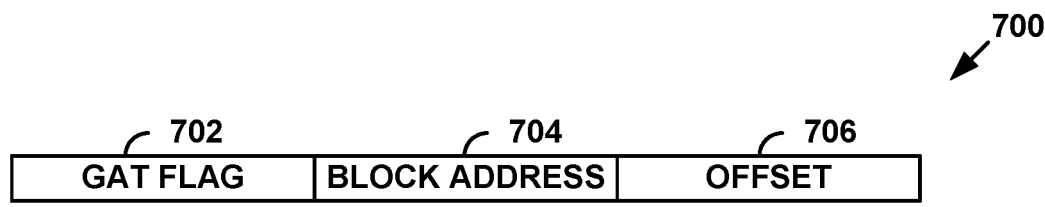
FIG. 7 is an embodiment of an exemplary data structure.

FIG. 7 depicts an embodiment of the data structure 700 for GAT 602 and GAT Page 606. Data structure 700 includes a GAT flag 702, a block address 704, and an offset 706. GAT flag 702 signifies whether the address of the data is in the GAT Directory or in a GAT Page. In an embodiment, GAT flag 702 is a single bit, where a zero indicates an address from the GAT Directory (e.g., sequential data), and where a one indicates an address in a GAT Page (e.g., random data). In other embodiments (described below) GAT flag 702 may have more than one bit. Block address 704 refers to the physical location of the data when GAT flag 702 is zero, and refers to the physical location of a GAT Page when GAT flag 702 is one. Offset 706 is an LG offset for the GAT Directory or a GAT Page offset for a GAT Page.

Figure 8A:
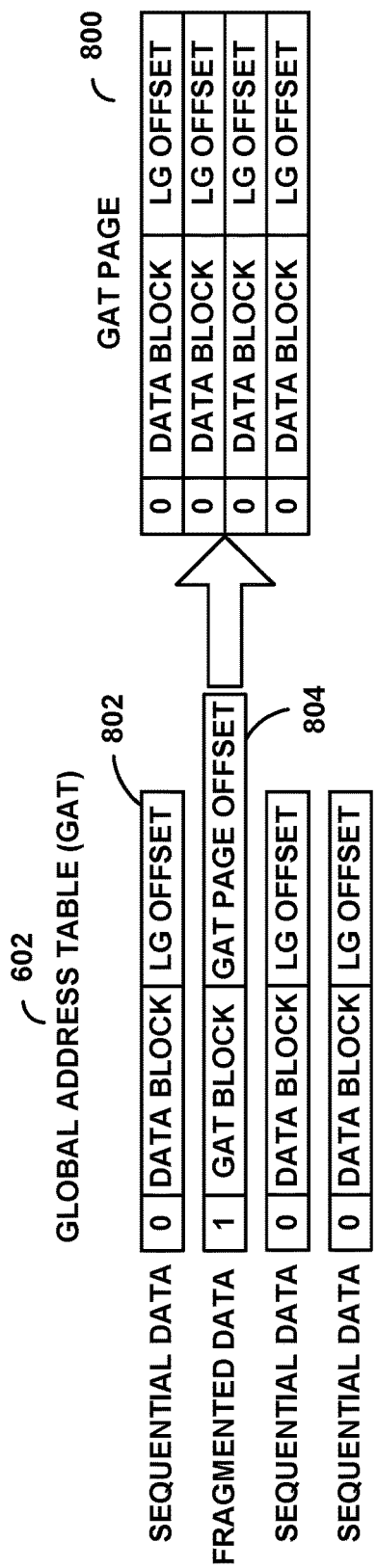
FIG. 8A is an embodiment using the data structure of FIG. 7 for a GAT and a GAT Page.

FIG. 8A depicts an embodiment using the data structure of FIG. 7 for GAT 602 and GAT Page 800. In particular, sequential data results in an entry 802 that includes a GAT flag=0, a Data Block that points to a metablock in the flash memory that contains the complete sequential LG, and an LG offset that points to a specific FMU of the sequential LG.

For fragmented data, entry 804 includes a GAT flag=1, a GAT Block that points to a metablock in the flash memory that contains GAT Page 800, and a GAT Page offset that points to a 4 KB fragment offset within the metablock that contains GAT Page 800. Each entry in GAT Page 800 includes a Data Block that points to a metablock that contains the fragmented FMU, and an LG Offset that points to a specific sector within the metablock for an FMU. Because the LG is fragmented, "Data Block" and "LG Offset" are defined separately for each FMU.

Figure 8B:
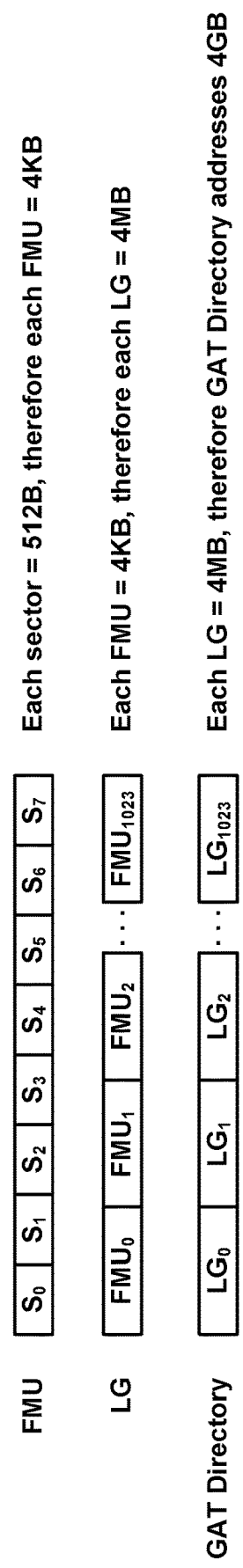
FIG. 8B illustrates an example flash management unit, logical group and GAT Directory.

FIG. 8B depicts an example FMU, LG and GAT Directory. In the illustrated example, an FMU includes eight sectors, with each sector having a size of 512 bytes, and thus each FMU has a size of 4 KB. Each LG includes 1024 FMUs, each having a size of 4 KB, and thus each LG has a size of 4 MB. Each Gat Directory includes 1024 LGs, each having a size of 4 MB, and thus the GAT Directory addresses 4 GB. Other numbers and sizes of sectors, other numbers and sizes of FMUs and other numbers and sizes of LGs may be used.

Figure 9:
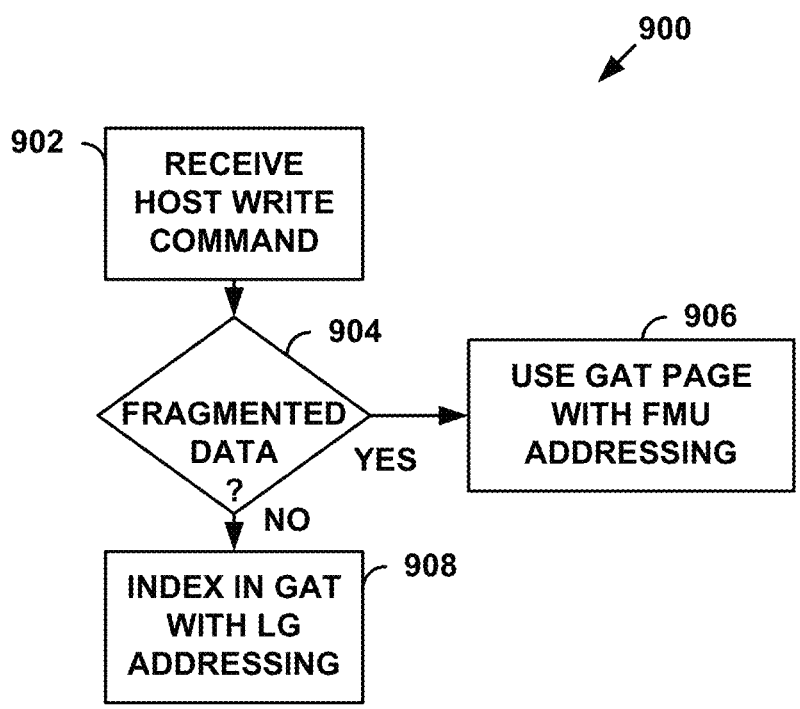
FIG. 9 is an exemplary process for indexing with different logical group sizes.

FIG. 9 is block diagram for an exemplary process 900 for indexing using a GAT that includes a GAT Directory that addresses sequential data in LGs, and addresses fragmented data in FMUs. In embodiments, memory controller 218 (FIG. 2) or front end 302/back end 304 (FIG. 3) may implement process 900. At step 902, an instruction to write data to the flash memory is received. At step 904, a determination is made at step 904 whether the data to be written are fragmented or sequential. For example, sequential data may be from the same file. When the data are determined in step 904 to be fragmented, then at step 906 the data are indexed using one or more GAT Pages using FMU addressing. If at step 904 the data are determined to be sequential, then at step 908 the data are indexed in the GAT Directory using LG addressing.

As described above, a host typically writes data to a memory system by designating a starting logical sector address and specifying the total number of sectors. In some instances, the host may specify a starting logical sector address that aligns with the starting sector of an FMU, and may specify a total number of sectors equal to an integer multiple of the number of sectors per FMU. In an unaligned write, however, the host specifies a starting logical sector address that does not align with the starting sector of an FMU, and/or specifies a total number of sectors that are not equal to an integer multiple of the number of sectors per FMU.

When the host specifies a starting logical sector address unaligned to an FMU, pre-pad of sectors needs to be done. As a first step, the physical location of the sectors to be pre-padded is decoded from the GAT tables. This is done by loading the GAT Directory and GAT Page to the cache. Once the physical location of the data in flash is identified, the sectors are fetched to memory controller RAM, appended to the host data and programmed. The same set of operations is repeated for post-pad sectors in case the end of the command is unaligned to an FMU.

As previously mentioned, this technique for handling unaligned writes disadvantageously increases the overhead required to load the GAT to cache, read data from the pre- and post-pad sectors and then load the data to RAM, risks corrupting data stored in sectors that were previously acknowledged to the host as successfully written, and increases write amplification because of the pre-padding and post-padding operations.

Technology is described for handling unaligned writes so that the start of a host write does not need to be aligned to an FMU. In this embodiment, the GAT is modified to also index data at an unaligned sector level, and includes a GAT Directory that contains entries for "chunks" of data, where each chunk is 512 KB (although other sizes can be used), an aligned GAT Page that contains an entry for each FMU, and an unaligned GAT Page that contains an entry for each sector.

In this embodiment, the GAT Directory includes 1024 entries, with eight entries for each LG, and each entry can have one of the following forms: (1) a sequential entry if the 512 KB chunk contains sequential data, (2) an aligned GAT Page if the FMUs in the 512 KB chunk are fragmented, but aligned, and (3) an unaligned GAT Page if the 512 KB chunk includes some unaligned writes. Other numbers of entries for each LG may be used.

Figure 10A:
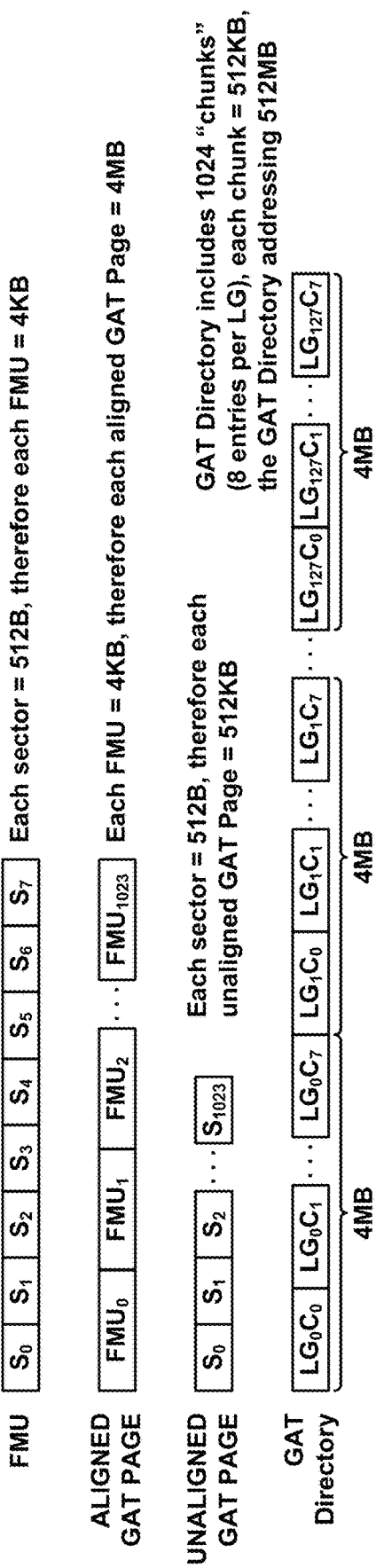
FIG. 10A is another embodiment using the data structure of FIG. 7 for a GAT and a GAT Page.

FIG. 10A depicts an example FMU, aligned GAT Page, unaligned GAT Page and GAT Directory. In the illustrated example, an FMU includes eight sectors, with each sector having a size of 512 bytes, and thus each FMU has a size of 4 KB. Each aligned GAT Page includes 1024 FMUs, each having a size of 4 KB, and thus each aligned GAT Page has a size of 4 MB. Each unaligned GAT Page includes 1024 sectors, each having a size of 512 bytes, and thus each unaligned GAT Page has a size of 512 KB. Each Gat Directory includes 1024 chunks ($C_0$, $C_1$, . . . , $C_7$), each having a size of 512 KB, and thus the GAT Directory addresses 512 MB. Other numbers and sizes of sectors may be used, other numbers and sizes of FMUs may be used, and other sizes of GAT Pages may be used.

In an embodiment, when a host issues an unaligned write command, an unaligned GAT Page is created only for that particular 512 KB chunk. In this regard, the GAT table is updated at the sector level dynamically only on determining an unaligned write request. Thus, the memory controller need not look up the FTL tables and fetch pre-pad and post-pad sectors for the unaligned write.

Figure 10B:
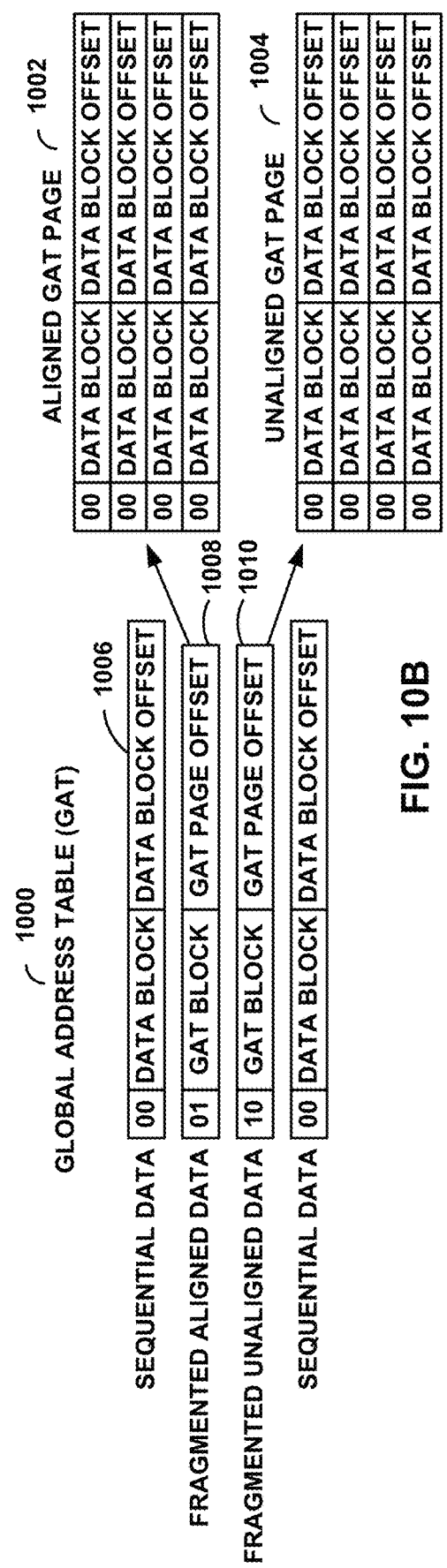
FIG. 10B illustrates another example flash management unit, logical group and GAT Directory.
Figure 10C:
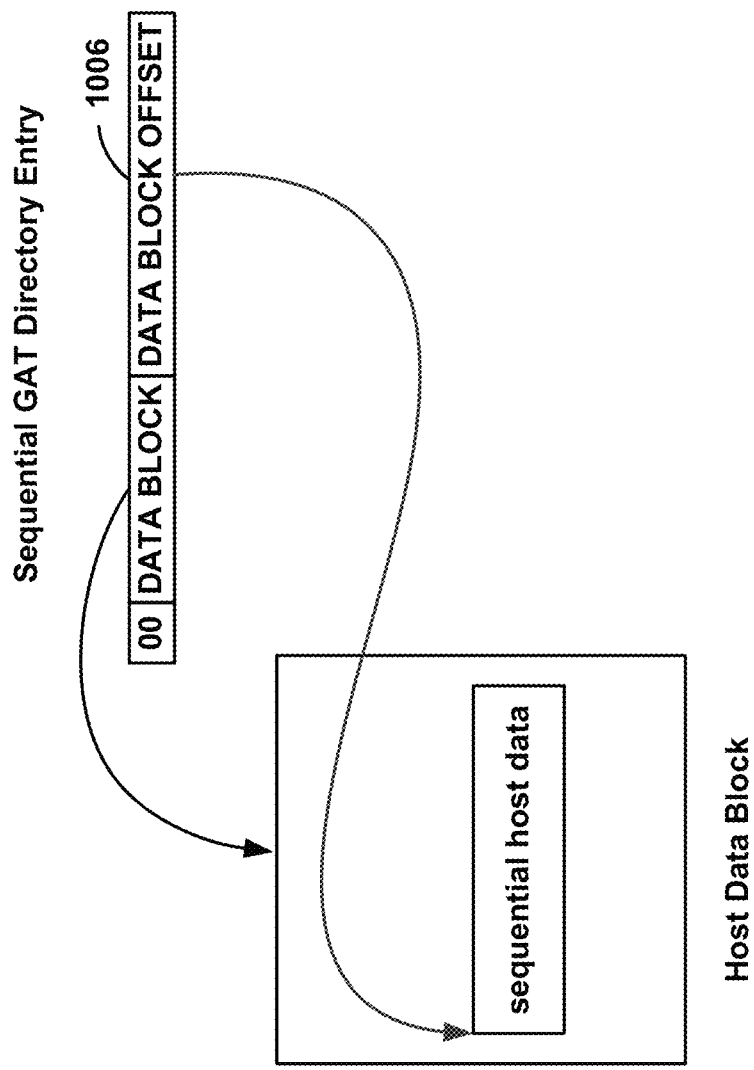
FIG. 10C illustrates an example of a sequential GAT directory entry and a host data block.

FIG. 10B depicts an embodiment using the data structure of FIG. 7 for GAT 1000, aligned GAT Page 1002 and unaligned GAT Page 1004. In this embodiment, a two-bit GAT flag 702 is used, with the following values:

00—sequential data
01—fragmented data, aligned GAT Page
10—fragmented data, unaligned GAT Page
11—undefined Referring to FIGS. 10B and 10C, sequential data results in an entry 1006 that includes a GAT flag=00, a Data Block that points to a metablock in the flash memory that contains the complete sequential chunk, and a Data Block offset that points to the first FMU of the sequential chunk.

Figure 10D:
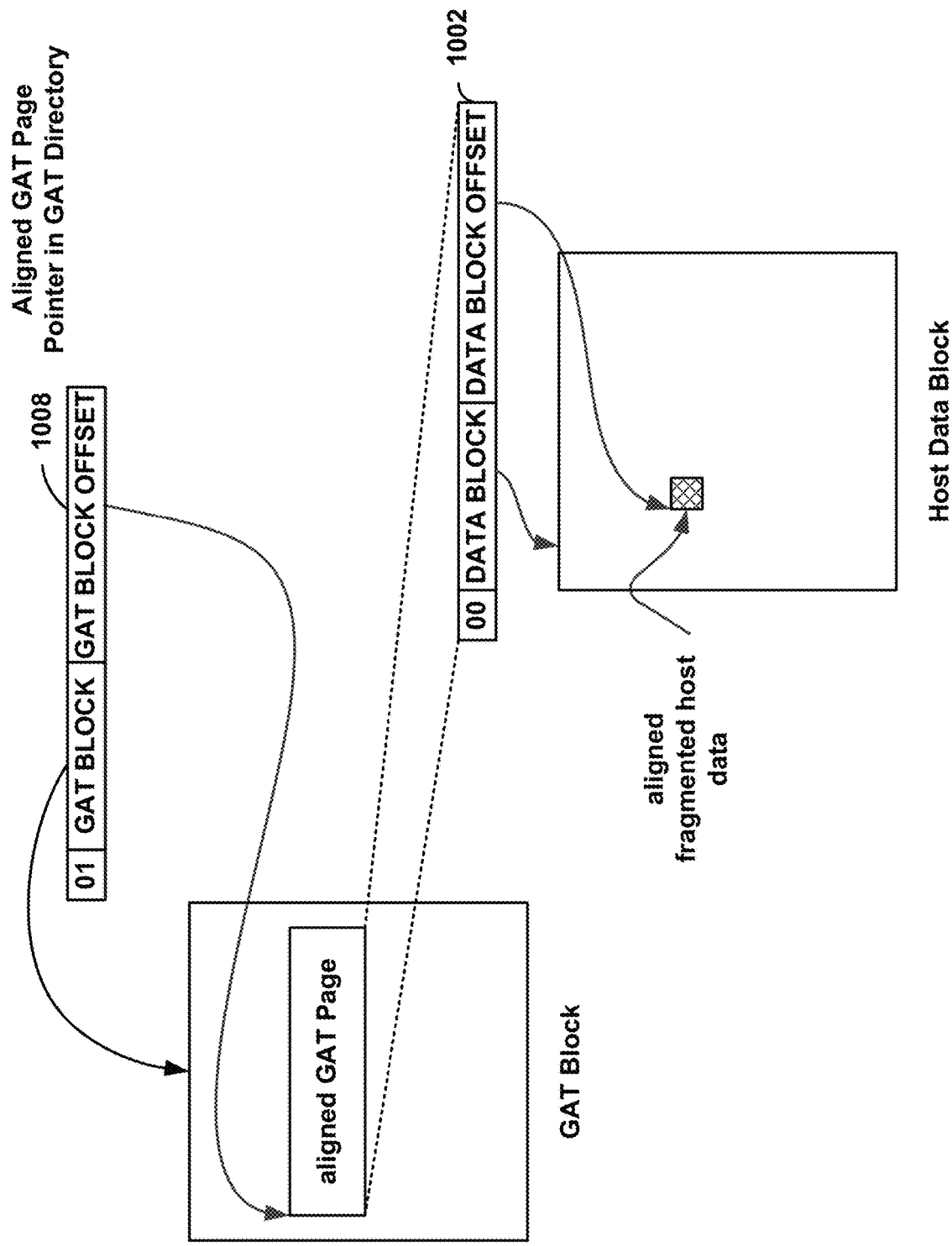
FIG. 10D illustrates an example of a GAT directory entry for fragmented aligned data.

Referring to FIGS. 10B and 10D, for fragmented aligned data, entry 1008 includes a GAT flag=01, a GAT Block that points to a metablock in the flash memory that contains aligned GAT Page 1002, and a GAT Page offset that points to a 4 KB fragment offset within the metablock that contains aligned GAT Page 1002. Each entry in aligned GAT Page 1002 includes a Data Block and a Data Block Offset that point to a metablock and a 4 KB fragment offset within the metablock for an FMU, respectively. Each entry in aligned GAT Page 1002 is associated with a corresponding FMU of the non-volatile memory. Because the chunk is fragmented, "Data Block" and "Data Block Offset" are defined separately for each FMU.

Figure 10E:
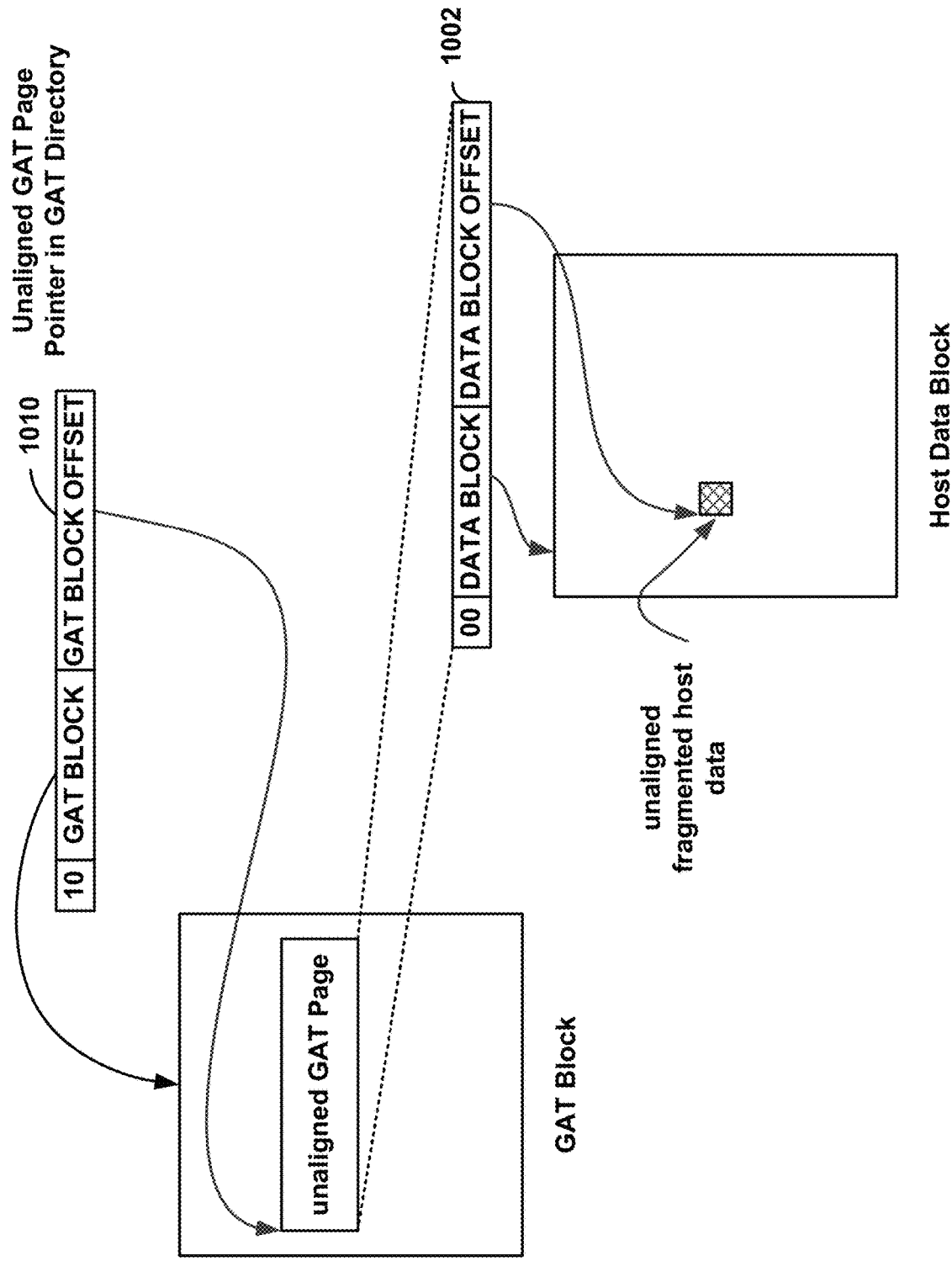
FIG. 10E illustrates an example of a GAT directory entry for fragmented unaligned data.

Referring to FIGS. 10B and 10E, for fragmented unaligned data, entry 1010 includes a GAT flag=10, a GAT Block that points to a metablock in the flash memory that contains unaligned GAT Page 1004, and a GAT Page offset that points to a 4 KB fragment offset within the metablock that contains unaligned GAT Page 1004. Each entry in unaligned GAT Page 1004 includes a Data Block and a Data Block Offset that point to a metablock and a 512 byte sector offset within the metablock for a sector, respectively. Each entry in unaligned GAT Page 1004 is associated with a corresponding sector of the non-volatile memory. Because the chunk is fragmented, "Data Block" and "Data Block Offset" are defined separately for each sector.

FIG. 11A illustrates an embodiment of GAT 1000 that includes eight chunk entries written with sequential data to LG0. That is, sequential data are written to chunks $LG_0C_0$, $LG_0C_1$, $LG_0C_2$, $LG_0C_3$, $LG_0C_4$, $LG_0C_5$, $LG_0C_6$ and $LG_0C_7$.

FIG. 11B illustrates an embodiment of GAT 1000 in which chunks $LG_0C_0$ and $LG_0C_1$ are over-written with fragmented data aligned to an FMU in chunks $LG_0C_0$ and $LG_0C_1$. In such an embodiment, an aligned GAT Page 0 is created in GAT 1000, and chunks $LG_0C_0$ and $LG_0C_1$ point to aligned GAT Page 0. Chunks $LG_0C_0$ and $LG_0C_1$ both point to the same aligned GAT Page because each chunk is 512 KB, and each aligned GAT Page can address a 4 MB range. In the embodiment of FIG. 11B, chunks $LG_0C_2$, $LG_0C_3$, $LG_0C_4$, $LG_0C_5$, $LG_0C_6$ and $LG_0C_7$ point to the sequential entry.

FIG. 11C illustrates an embodiment in which chunk $LG_0C_1$ is overwritten with fragmented data unaligned to an FMU. In such an embodiment, an unaligned GAT Page 2 is created in GAT 1000. Chunk $LG_0C_0$ points to aligned GAT Page 0, chunk $LG_0C_1$ points to unaligned GAT Page 2, and chunks $LG_0C_2$, $LG_0C_3$, $LG_0C_4$, $LG_0C_5$, $LG_0C_6$ and $LG_0C_7$ point to the sequential entry.

Figure 12:
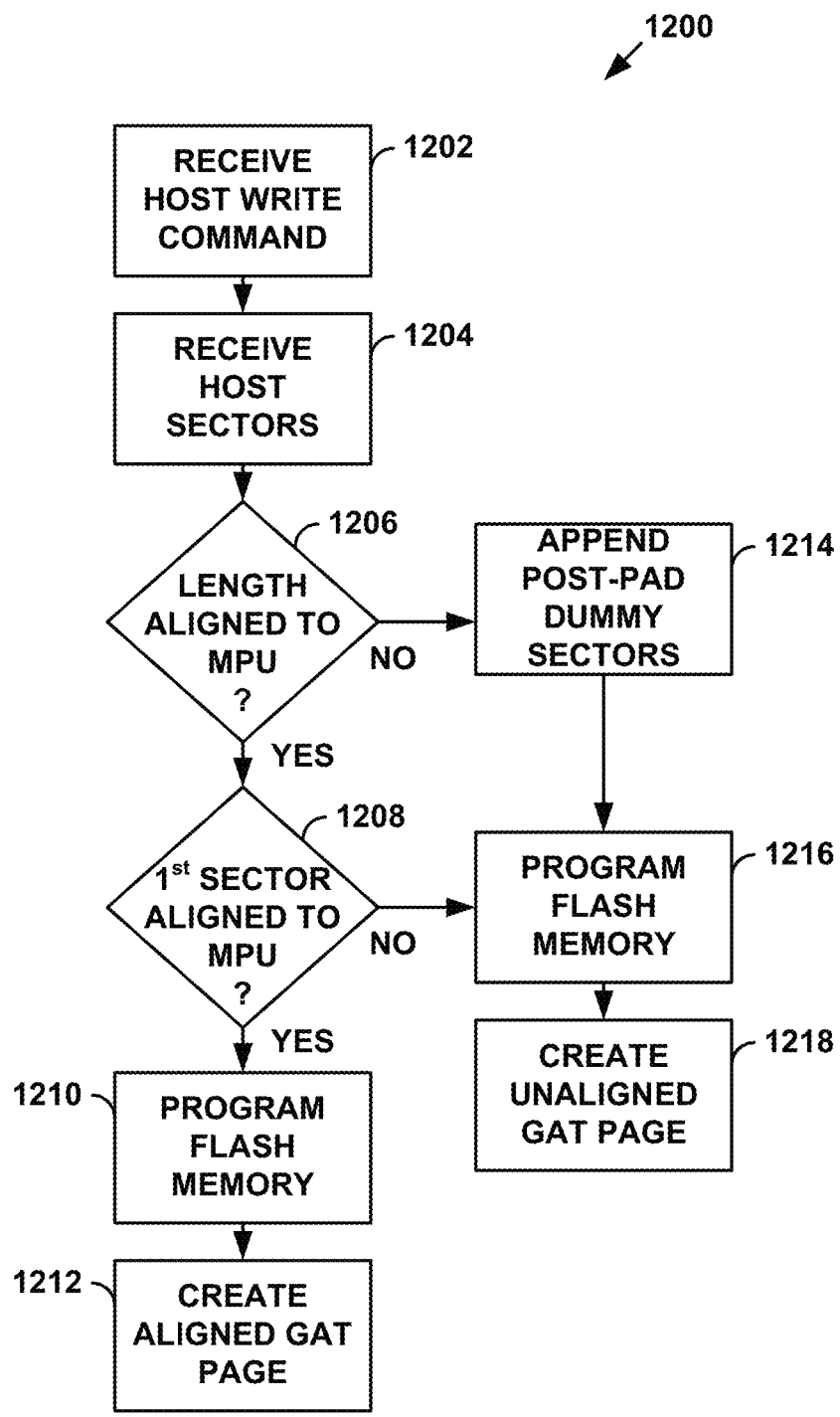
FIG. 12 is an exemplary process for indexing fragmented data with aligned and unaligned GAT Pages.

FIG. 12 is block diagram for an exemplary process 1200 for writing fragmented data to flash memory. In embodiments, memory controller 218 (FIG. 2) or front end 302/back end 304 (FIG. 3) may implement process 1200. At step 1202, a host write command is received. For example, memory controller 218 of memory system 202 may receive a write command from host 200 (FIG. 1). At step 1204, fragmented data are received. For example, host 200 may provide fragmented data in the form of one or more sectors to memory controller 218 of memory system 202 (FIG. 2). At step 1206, a determination is made whether the length of the host data (e.g., the number of host sectors) is aligned to a minimum program unit (e.g., an FMU). For example, if an FMU includes eight sectors, the length of the host data is aligned to an FMU if the number of host sectors to be written is an integer multiple of 8.

If at step 1206 a determination is made that the length of the host data is aligned to a minimum program unit, then at step 1208 a determination is made whether the start sector of the write command is aligned to a minimum program unit (e.g., an FMU). If at step 1208 a determination is made that the start sector of the write command is aligned to a minimum program unit, then at step 1210, the fragmented data are written to flash memory. At step 1212, an aligned GAT Page is created for the fragmented data written to flash memory.

If at step 1206 a determination is made that the length of the host data is not aligned to a minimum program unit, then at step 1214 dummy sectors are post-padded to the host data. For example, if a minimum program unit includes eight sectors, and the host write data includes five sectors, then three dummy sectors are padded to the host data. At step 1216, the fragmented data are written to flash memory, and at step 1218, an unaligned GAT Page is created for the fragmented data written to flash memory.

If at step 1208 a determination is made that the start sector of the write command is not aligned to a minimum program unit, then at step 1216, the fragmented data are written to flash memory, and at step 1218, an unaligned GAT Page is created for the fragmented data written to flash memory.

Figure 1C:
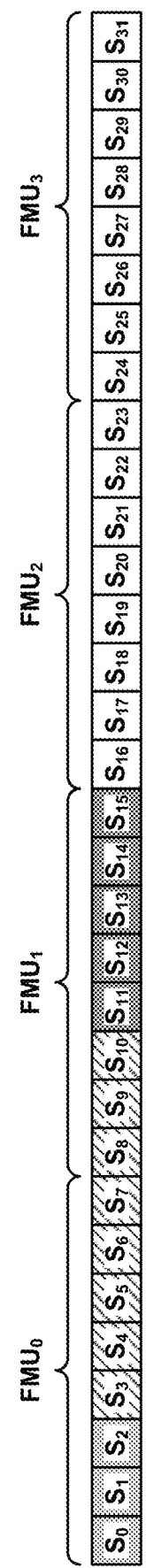

FIG. 1C illustrated a scenario in which the host designated a starting logical sector address that is mapped to sector $S_3$ of $FMU_0$, specified a total of eight sectors to write (i.e., sectors $S_3$, $S_4$, $S_5$, $S_6$, $S_7$ of $FMU_0$, and sectors $S_8$, $S_9$, $S_{10}$ of $FMU_1$). As described above, previously known memory controllers typically pad sectors to the specified host data so that the memory system can program in FMU minimum write units. So in the unaligned write example described above, a previously known memory controller would pre-pad the host data to be written with the existing data from sectors $S_0$, $S_1$, $S_2$ of $FMU_0$, and would post-pad the host data to be written with existing data from sectors $S_{11}$, $S_{12}$, $S_{13}$, $S_{14}$, $S_{15}$ of $FMU_1$.

Figure 13A:
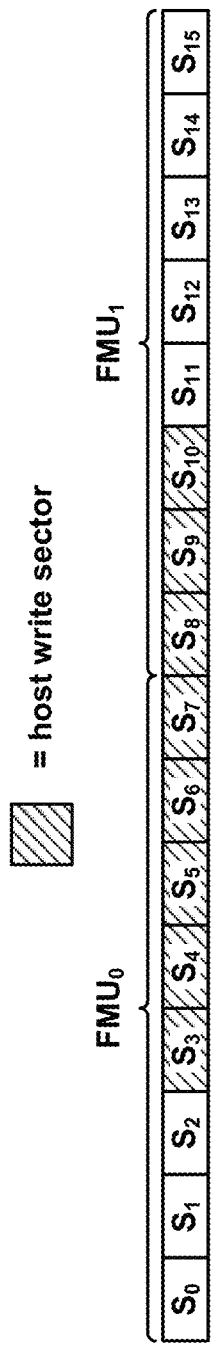
FIGS. 13A-13B are diagrams depicting data structures of a memory system.

In accordance with the technology described herein, such pre-padding is not necessary for unaligned writes. In particular, referring to FIG. 13A, the eight sectors of host data $S_3$, $S_4$, $S_5$, $S_6$, $S_7$, $S_8$, $S_9$, $S_{10}$ are written to flash memory with no padded sectors, because eight sectors aligns with the minimum programmable unit.

Figure 13B:
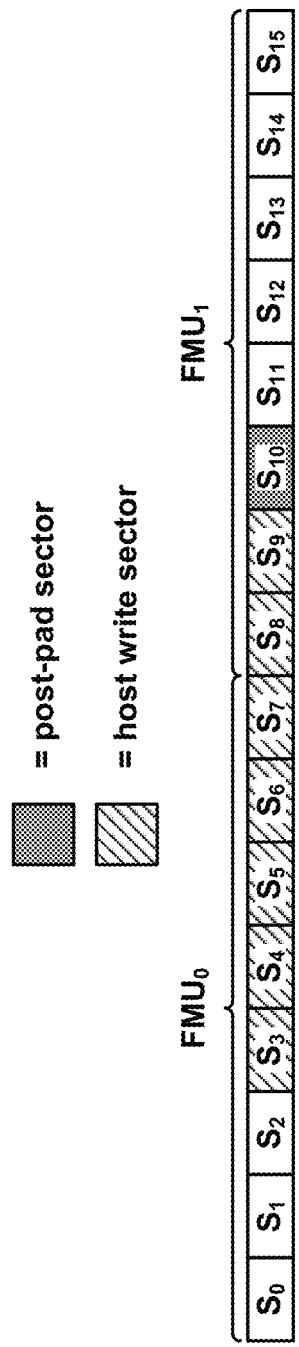

FIG. 13B illustrates an example in which start sector is $S_3$ and the number of sectors to write is 7. Seven host sectors $S_3$, $S_4$, $S_5$, $S_6$, $S_7$, $S_8$, $S_9$ are written followed by a post-padded dummy sector $S_{10}$. Thus, in the examples illustrated in FIGS. 13A-13B, the memory controller (e.g., memory controller 218 of FIG. 2) may write data to flash memory (e.g., flash memory 216 of FIG. 2) without first pre-padding the data.

Without wanting to be bound by any particular theory, it is believed that the disclosed technology may reduce the number of control page reads, may reduce the number of padding sector reads, and may reduce write amplification.

As used herein, a "computer-readable medium," "machine readable medium," "propagated-signal" medium, and/or "signal-bearing medium" may be any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Thus, as described above, one embodiment includes an apparatus that includes a non-volatile memory and a memory controller coupled to the non-volatile memory. The memory controller is configured to access a GAT that maps logical addresses of a host to physical addresses of the non-volatile memory, receive a request from the host to write first data to the non-volatile memory, determine that the first data comprises fragmented data that are not aligned to a minimum write unit of the non-volatile memory, and create an unaligned GAT page, wherein the unaligned GAT page comprises a logical-to-physical mapping for the first data.

One embodiment includes a method including maintaining in a memory system a GAT for mapping logical-to-physical address in a non-volatile memory, receiving by the memory system from a host data to be written to the non-volatile memory, determining that the data to be written is not aligned to a minimum write unit of the non-volatile memory, and indexing the data to be written in an unaligned GAT page.

One embodiment includes a memory system including a non-volatile memory including a plurality of memory cells, and a memory controller coupled to the non-volatile memory. The memory controller is configured to receive a request from the host to write data to the non-volatile memory, determine that the data is fragmented data that are not aligned to a minimum write unit of the non-volatile memory, and write the data to the non-volatile memory without pre-padding the data.

The foregoing detailed description has been presented for purposes of illustration and description. It is not intended to be exhaustive or be limited to the precise form disclosed. Many modifications and variations are possible in light of the above description. The described embodiments were chosen to best explain the principles of the technology and its practical application, to thereby enable others skilled in the art to best utilize the technology in various embodiments and with various modifications as are suited to the particular use contemplated. The scope of the technology is defined by the claims appended hereto.

The invention claimed is:

1. Apparatus comprising:
a non-volatile memory; and
a memory controller coupled to the non-volatile memory, the memory controller configured to:
  access a global address table (GAT) that maps logical addresses of a host to physical addresses of the non-volatile memory;
  receive a request from the host to write first data to the non-volatile memory, wherein the write request comprises a starting logical sector address;
  determine that the first data comprises fragmented data that are not aligned to a starting sector of a minimum write unit of the non-volatile memory, wherein the minimum write unit comprises a plurality of sectors;
  create an unaligned GAT page, wherein the unaligned GAT page comprises a logical-to-physical mapping of individual sectors for the first data; and
  include an entry in the GAT that points to the unaligned GAT page.

2. The apparatus of claim 1, wherein the unaligned GAT page comprises a plurality of entries, each entry comprising an amount of data smaller than an amount of data in the minimum write unit.

3. The apparatus of claim 1, wherein the unaligned GAT page comprises a plurality of entries, each entry associated with a corresponding sector of the non-volatile memory.

4. The apparatus of claim 1, wherein the memory controller is further configured to:
  receive a request from the host to write second data to the non-volatile memory;
  determine that the second data comprises fragmented data that are aligned to the minimum write unit of the non-volatile memory;
  create an aligned GAT page, wherein the aligned GAT page comprises a logical-to-physical mapping for the second data; and
  include an entry in the GAT that points to the aligned GAT page.

5. The apparatus of claim 4, wherein the aligned GAT page comprises a plurality of entries, each entry comprising an amount of data equal to an amount of data in the minimum write unit.

6. The apparatus of claim 4, wherein the aligned GAT page comprises a plurality of entries, each entry associated with a corresponding flash management unit of the non-volatile memory.

7. The apparatus of claim 1, wherein the memory controller is further configured to:
  receive a request from the host to write third data to the non-volatile memory;
  determine that the third data comprises sequential data;
  create an entry in the GAT that comprises a logical-to-physical mapping for the third data.

8. The apparatus of claim 7, wherein the GAT comprises a plurality of entries comprising a logical group.

9. The apparatus of claim 7, wherein the GAT comprises a plurality of entries comprising a plurality of logical groups.

10. The apparatus of claim 1, wherein the GAT comprises a plurality of entries, each entry comprising a flag indicating whether data stored in physical addresses of the non-volatile memory comprise sequential data or fragmented data.

11. The apparatus of claim 1, wherein the GAT comprises a plurality of entries, each entry comprising a flag indicating whether data stored in physical addresses of the non-volatile memory comprise data aligned to the minimum write unit of the non-volatile memory, or data unaligned to the minimum write unit of the non-volatile memory.

12. The apparatus of claim 1, wherein the GAT comprises the unaligned GAT page.

13. The apparatus of claim 1, wherein the GAT comprises the aligned GAT page.

14. A method comprising:
  maintaining in a memory system a global address table (GAT) for mapping logical-to-physical address in a non-volatile memory;
  receiving by the memory system from a host data to be written to the non-volatile memory, wherein the data to be written comprises a starting logical sector address;
  determining that the data to be written is not aligned to a starting sector of a minimum write unit of the non-volatile memory, wherein the minimum write unit comprises a plurality of sectors;
  indexing the data to be written in an unaligned GAT page, wherein the unaligned GAT page comprises a logical-to-physical mapping of individual sectors of the data to be written; and
  including an entry in the GAT that points to the unaligned GAT page.

15. The method of claim 14, further comprising:
  determining that the data to be written is aligned to a minimum write unit of the non-volatile memory; and
  indexing the data to be written in an aligned GAT page.

16. The method of claim 14, further comprising:
  determining that the data to be written comprises sequential data; and
  creating an entry in the GAT that comprises a logical-to-physical mapping for the data to be written.

17. The method of claim 14, wherein the unaligned GAT page comprises a plurality of entries, each entry comprising an amount of data smaller than an amount of data in the minimum write unit.

18. The method of claim 15, wherein the aligned GAT page comprises a plurality of entries, each entry comprising an amount of data equal to an amount of data in the minimum write unit.

19. The method of claim 16, wherein the entry in the GAT comprises a plurality of entries comprising a logical group.

20. A memory system comprising:
  a non-volatile memory comprising a plurality of memory cells;
  a memory controller coupled to the non-volatile memory, the memory controller configured to:
    receive a request from the host to write data to the non-volatile memory, wherein the write request comprises a starting logical sector address;
    determine that the data comprises fragmented data that are not aligned to a starting sector of a minimum write unit of the non-volatile memory;
    create entries in a logical-to-physical mapping table of individual sectors of the data, wherein a sector comprises less than a minimum write unit of the non-volatile memory; and
    write the data to the non-volatile memory.

* * * * *